United States Patent
Agrawal et al.

(10) Patent No.: US 7,243,097 B1
(45) Date of Patent: Jul. 10, 2007

(54) EXTENDING RELATIONAL DATABASE SYSTEMS TO AUTOMATICALLY ENFORCE PRIVACY POLICIES

(75) Inventors: Rakesh Agrawal, San Jose, CA (US); Paul Miller Bird, Markham (CA); Tyrone W. A. Grandison, San Jose, CA (US); Gerald George Kiernan, San Jose, CA (US); Scott Ian Logan, Don Mills (CA); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/307,763

(22) Filed: Feb. 21, 2006

(51) Int. Cl.
*G06F 7/00* (2006.01)
*G06F 17/00* (2006.01)

(52) U.S. Cl. .......................... 707/3; 707/100
(58) Field of Classification Search .................... 707/3, 707/9, 10, 100; 709/220, 225
See application file for complete search history.

(56) References Cited

U.S. PATENT DOCUMENTS

| | | | |
|---|---|---|---|
| 5,941,947 A * | 8/1999 | Brown et al. ................ | 709/225 |
| 6,065,012 A | 5/2000 | Balsara et al. | |
| 6,253,203 B1 * | 6/2001 | O'Flaherty et al. ............ | 707/9 |
| 6,496,832 B2 | 12/2002 | Chi et al. | |
| 2002/0095405 A1 * | 7/2002 | Fujiwara ......................... | 707/3 |
| 2004/0215626 A1 | 10/2004 | Colossi et al. | |
| 2005/0144176 A1 * | 6/2005 | Lei et al. ..................... | 707/100 |
| 2005/0289342 A1 | 12/2005 | Needham | |

OTHER PUBLICATIONS

P3P Definition, obtained from www.wikipedia.org, Jun. 27, 2006.*
Graefe, Goetz; "Query Evaluation Techniques for Large Databases"; ACM Computing Surveys, vol. 25, No. 2, Jun. 1993.
Agrawal et al.; "Hippocratic Databases"; Proceedings of the 28th VLDB Conference, Hong Kong, China, 2002.
LeFevre et al.; "Limiting Disclosure in Hippocratic Databases"; Proceedings of the 30th VLDB Conference, Toronto, Canada, 2004.
"New Features in Adaptive Server Version 12.5"; What's New in Adaptive Server Enterprise?; Chapter 1; http://manuals.sybase.com/onlinebooks/group-as/asg1250e/whatsnew/@Generic__Book TextView/445;hf=0#X.
"Fine Grained Access Control and Application Contexts" Ask Tom (part of Oracle Magazine); Jun. 1999; http://asktom.oracle.com/~tkyte/article2/index.html.
Stonebraker et al.; "Access Control in a Relational Data Base Management System by Query Modification"; Department of Electrical Engineering and Computer Sciences and the Electrical Research Laboratory, University of California, Berkley, California 94720.
Chamberlin, Don; "A Complete Guide to DB2 Universal Database"; pp. 122-128; Morgan Kaufmann Publ.; Jun. 1998.
Nanda et al; "Oracle Privacy Security Auditing: Includes Federal Law Compliance with HIPAA, Sarbanes-Oxley & The Gramm-Leach-Bliley Act GLB"; pp. 240-251; Oracles in Focus; Rampant TechPress; Dec. 2003.

* cited by examiner

*Primary Examiner*—Sam Rimell
(74) *Attorney, Agent, or Firm*—Ramraj Soundararajan; IP Authority, LLC

(57) ABSTRACT

A method of transforming relational database management systems into their privacy-preserving equivalents is provided. Language constructs allow fine grained access control (FGAC) restrictions to be specified on the access to data in a table at the level of a row, a column or a cell. Fine grained restrictions are a combination of access control and privacy policy restrictions, which ensure compliance with current privacy legislation mandates.

13 Claims, 6 Drawing Sheets

```
create restriction restriction-name
on table-x
for auth-name-1 [ except auth-name-2]
( (    (to columns column-name-list)
    |  (to rows [ where search-condition ] )
    |  (to cells (column-name-list [ where search-condition ] )+ )
  )
  [ for purpose purpose-list ]
  [ for recipient recipient-list ]
)+
command-restriction
```

```
1   for each table reference t in query Q do begin
2     if (exists a restriction r pertaining to t for Q) then begin
3       create a dynamic view v ∈ Q over t
4       replace each reference to t ∈ Q with a reference to v ∈ Q // create the dynamic view v using
        // the following print statements
        //
5       print "select"
6       for each column c ∈ t do begin
            // c_p, c_r are the purposes, recipients
            // of column c in restriction r
            // Q_p, Q_r are the purpose, recipient of query Q
            //
7           if (c ∉ r|Q_p ∈ c_p ∧ Q_r ∈ c_r
                // c isn't included in the restriction r
                // access to c is thus prohibited
                //
8               print "null"
9           else begin
                // The whereClause function returns
                // the predicate associated with c
                // that is specified in the restriction
                //
10              let w = whereClause(c)
11              if w = null then
                    // There is no "where" condition
                    // governing the use of c ∈ r, thus access
                    // to all column values is granted unconditionally
                    //
12                  print c.colname
13              else begin
                    // Implement the "where" condition
                    // using a SQL case statement to grant
                    // only conditional access to the column c
                    //
14                  print "case when exists ("
15                  print w.condition
16                  print ")"
17                  print "then"
18                  print c.colname
19                  print "else null end as"
20                  print c.colname
21              end
22          end
23      end
24      print "from"
25      print t.tablename
26  end
```

Figure 4

```
...
<!-- Statement1 -->
<STATEMENT>
 <CONSEQUENCE>
  Encodes that personal and medical information
  can be accessed for emergency purposes
  by ourselves
 </CONSEQUENCE>
 <PURPOSE>
  <other-purpose>
    Emergency
  </other-purpose>
 </PURPOSE>
 <RECIPIENT><ours/></RECIPIENT>
 <RETENTION><stated-purpose/></RETENTION>
 <DATA-GROUP>
  <DATA ref = "#personal"/>
  <DATA ref = "#medical">
   <CATEGORIES>
    <health/>
   </CATEGORIES>
  </DATA>
 </DATA-GROUP>
</STATEMENT>

<!-- Statement2 -->
 <STATEMENT>
  <CONSEQUENCE>
   Encodes that we and drug companies
   with the same data usage policies
   can access personal and medical information
   for new_drug_research on an opt-out basis
  </CONSEQUENCE>
  <PURPOSE><develop/></PURPOSE>
  <RECIPIENT>
   <ours required="opt-out"/>
   <same required="opt-out"/>
  </RECIPIENT>
  <RETENTION><stated-purpose/></RETENTION>
  <DATA-GROUP>
   <DATA ref = "#personal"/>
   <DATA ref = "#medical">
    <CATEGORIES>
     <health/>
    </CATEGORIES>
   </DATA>
  </DATA-GROUP>
 </STATEMENT>
 ...
```

Figure 5

```
create restriction Statement1
on Patients
for public
to cells         Name, SSN, Address, Email, DOB,
                 XRay, Pharmacy, Family,
                 Appointment, Lifestyle
    purpose Emergency
    recipient ours
restricting access to select create restriction Statement2.1
on Patients
for public
to cells         Name, SSN, Address, Email, DOB,
                 XRay, Pharmacy, Family,
                 Appointment, Lifestyle
      where
         exists (
            select 1
            from SysCat.Choices_Patients cp
            where cp.ID = Patients.ID
               and cp.C1 = 1 )
    for purpose develop
    for recipient ours
restricting access to select create restriction Statement2.2
on Patients
for public
to cells         Name, SSN, Address, Email, DOB,
                 XRay, Pharmacy, Family,
                 Appointment, Lifestyle
      where
         exists (
            select 1
            from SysCat.Choices_Patients cp
            where cp.ID = Patients.ID
               and cp.C2 = 1 )
    for purpose develop
    for recipient same
restricting access to select
```

Figure 6

```
1   for each statement s in policy do begin
2      for each purpose p in s do begin
3         for each recipient r in s do begin 4            print "create restriction "
5            print generate-unique-restriction-name()
6            print " on table "
7            print mapP3PStatementToTable(s)
8            print " for public "
9            print " to cells "
10           print mapP3PDataTypeToColumns(s)

11           if (p.required != always) then
12              print "where exists (select 1 from "
13                 + mapP3PPurposeToChoiceTable(s)
14                 + " p where p.ID = "+ mapP3PStatementToTable(s) +".ID
15                 and "+ mapP3PPurposeToChoiceColumn(s,p) + "= 1))"

16           if (r.required != always) then
17              print "and exists (select 1 from "
18                 + mapP3PRecipientToChoiceTable(s)
19                 + " r where r.ID = "+ mapP3PStatementToTable(s) +".ID"
20                 + "and "+ mapP3PRecipientToChoiceColumn(s,r) + "= 1))"
21           print "for purpose" + p.name
22           print "for recipient" + r.name
23        end
24     end
25  end
26  print "restricting access to select"
```

Figure 7

EXTENDING RELATIONAL DATABASE SYSTEMS TO AUTOMATICALLY ENFORCE PRIVACY POLICIES

FIELD OF THE INVENTION

The present invention relates generally to the field of database systems. More specifically, the present invention is related to privacy preserving relational database management systems.

DISCUSSION OF PRIOR ART

The pervasive use of computing technology and the increased reliance on information systems have created a heightened awareness and concern about the storage and use of private information. This worldwide phenomenon has ushered in a plethora of privacy-related guidelines and legislations, e.g. the OECD Privacy Guidelines in Europe, the Canadian Privacy Act, the Australian Privacy Amendment Act, the Japanese Privacy Code, the Health Insurance Portability and Accountability Act (HIPAA), and Gramm-Leach-Bliley Consumer Privacy Rule. Compliance with these legislations has become an important corporate concern. The current methods employed to address the disclosure compliance problem involve training individuals to be cognizant of the various regulations and changing organizational processes and procedures. However, these approaches are only a partial solution and need to be augmented with technological support.

The users of relational databases require that a fine grained access control (FGAC) implementation meet the following desiderata:
 the implementation must solve the problem within the database itself without application changes or application awareness of the implementation.
 the implementation must ensure that all users of the data are covered, regardless of how the data is accessed.
 the implementation must minimize the complexity and maintenance of the FGAC policies.
 the implementation must provide the ability to control access to rows, columns, or cells as desired.

Traditional methods of database access control have relied upon the use of statically defined views, which are logical constructs defined over database tables that can alter or restrict the data seen by a user. Using predefined views as the method for FGAC works well only when the number of different restrictions is few or the granularity of the restrictions is such that it affects large, easily identified groups of users. When these conditions are not true, view definitions can become complex in an effort to accommodate all the restrictions in one view. This complexity can strain system limits and can make maintenance of views difficult.

If a large number of views are used, each one implementing restrictions for a specific set of users, one issue that arises is how to correctly route user requests to the view that is appropriate to them. Often, the solution chosen is to resolve the request in the application, not in the database. Moreover, if a user can bypass the view when accessing data, for example by having direct access to the underlying tables, then the restrictions are not enforced.

Given the shortcomings of the traditional methods of implementing FGAC, some database vendors have proposed solutions that do not rely on the use of views to control access to tabular data. For instance, Oracle™ Virtual Private Database solution as described in article titled, "Fine-grained access control" by Kyte and pages 240–253 of book titled, "Oracle Privacy Security Auditing" by Nanda et al., allows users to define a security policy, which is a function written in PL/SQL that returns a string representing a predicate, and to attach the security policy to a table. When that table is accessed, the security policy is automatically enforced. In essence, row restrictions traditionally handled by views are allowed to be dynamically added to queries as described in article entitled, "Access control in a relational database management system by query modification", by Wong et al. The disadvantages of this approach are that Oracle™ requires user programming of a strictly defined "predicate producing" procedure in order to implement a security policy and it does not address column or cell restrictions. Sybase® Row Level Access Control as described in e-book entitled, "Sybase—Sybase Adaptive Server Enterprise 12.5, System Administration Guide", allows users to define access rules that apply restrictions to retrieved data. Sybase® Adaptive Server Enterprise 12.5 enables the database owner or table owner to restrict access to a table's rows by defining access rules and binding those rules to the table. Access to data can be further controlled by setting application contexts and creating login triggers. Access rules apply restrictions to retrieved data, enforced on select, update and delete operations. Adaptive Server enforces the access rules on all columns that are read by a query, even if the columns are not included in the select list. Using access rules is similar to using views, or using an adhoc query with where clauses. The query is compiled and optimized after the access rules are attached, so it does not cause performance degradation. Access rules provide a virtual view of the table data, the view depending on the specific access rules bound to the columns. Sybase® needs to create a separate access rule for each predicate, and'ing them, and then binding them to the appropriate columns. Microsoft® SQL Server primarily supports traditional view based access control, though it has a feature called row level permissions, but it seems to be usable only with table hierarchies. In IBM® DB2, the only support for FGAC is currently provided through the view mechanism.

The following references provide for creating views of datasets in database systems.

U.S. patent assigned to Microsoft Corporation, (U.S. Pat. No. 6,065,012), discloses rows and columns with data source control which will be asked for data in a particular cell. A dynamic summary view is generated by defined HTML page that links data binding HTML tables and other HTML controls to predetermined data within a storage of data. Accessing the subset of the program module is done at the cell level and may be done by executing a script to call defined methods of the objects within the program module or accessing a control module defined within the program module.

U.S. patent assigned to NCR Corporation, (U.S. Pat. No. 6,253,203), uses a large number of statically defined views to handle restrictions.

U.S. patent assigned to University of Minnesota, (U.S. Pat. No. 6,496,832), discloses a system for analyzing data organized into data sets and for transforming datasets into a visual representation. The visual representation appears to provide a dynamic view of cell structure and transformed data sets with the value of cells linked.

U.S. patent application publication assigned to International Business Machines Corporation, (2004/0215626 A1), discloses a method and system for improving performance of database queries within an RDBMS system with metadata objects. The view of the data in support of one or more summary tables is automatically identified and adjusted.

Article entitled, "Query Evaluation Techniques for Large Databases", by Graefe, discloses enforcement of access control within a relational database environment.

Article entitled, "Hippocratic Databases" by Agrawal et al., discusses a vision of database systems that take responsibility for the privacy of data they manage, inspired by the Hippocratic Oath. The article also enunciates the key privacy principles that Hippocratic Databases should support.

Article entitled, "Limiting Disclosure in Hippocratic Databases" by LeFevre et al., discusses the incorporation of privacy policy enforcement into an existing application and database environment. Privacy policies (prescribed rule and conditions) are stored in the database where they can be used to enforce limited disclosure. Every query is associated with purpose and recipient pairs. SQL queries issued to the database are intercepted and augmented to reflect the privacy policy rules regarding the purpose and recipient issuing the query.

Whatever the precise merits, features, and advantages of the above cited references, none of them achieves or fulfills the purposes of the present invention.

SUMMARY OF THE INVENTION

The present invention provides for a method of providing fine grained access control within a database, the method comprising the steps of: receiving a user query; identifying and combining restrictions relevant to the user query, the restrictions specifying access to data in a table in the database at the level of at least one of or a combination of: individual rows, individual columns or individual cells, and the restrictions comprising a combination of access control and privacy policy restrictions; transforming the user query into an equivalent query which implements the restrictions; and accessing the data based on the equivalent query.

The present invention provides for a system providing fine grained access control (FGAC) within a database, wherein the system comprises a policy translator which accepts as input a least a privacy policy and privacy metadata catalogs; and a relational database which stores the privacy metadata catalogs and FGAC restrictions. The FGAC restrictions specify access to data in a table in the relational database at the level of at least one of or a combination of: individual rows, individual columns or individual cells, these restrictions comprising a combination of access control and privacy policy restrictions.

The present invention provides for an article of manufacture comprising a computer usable medium having computer readable program code embodied therein which provides fine grained access control within a database, the medium comprising: computer readable program code aiding in receiving a user query; computer readable program code identifying restrictions on access to data in a table in the database at the level of at least one or a combination of: individual rows, individual columns or individual cells, the restrictions comprising a combination of access control and privacy policy restrictions; computer readable program code transforming the user query into an equivalent query which implements the restrictions; and computer readable program code aiding in accessing the data based on the equivalent query.

BRIEF DESCRIPTION OF THE DRAWINGS

FIG. 4 illustrates an algorithm for enforcing fine grained restrictions, as per the present invention.

FIG. 5 illustrates an example of a privacy policy for a healthcare provider, as per the present invention.

FIG. 6 illustrates the translation of a privacy policy into fine grained cell level restrictions, as per the present invention.

FIG. 7 illustrates an algorithm for translating a P3P privacy policy into fine grained cell level restrictions, as per the present invention.

BRIEF DESCRIPTION OF THE PREFERRED EMBODIMENTS

Figures 1, 2:
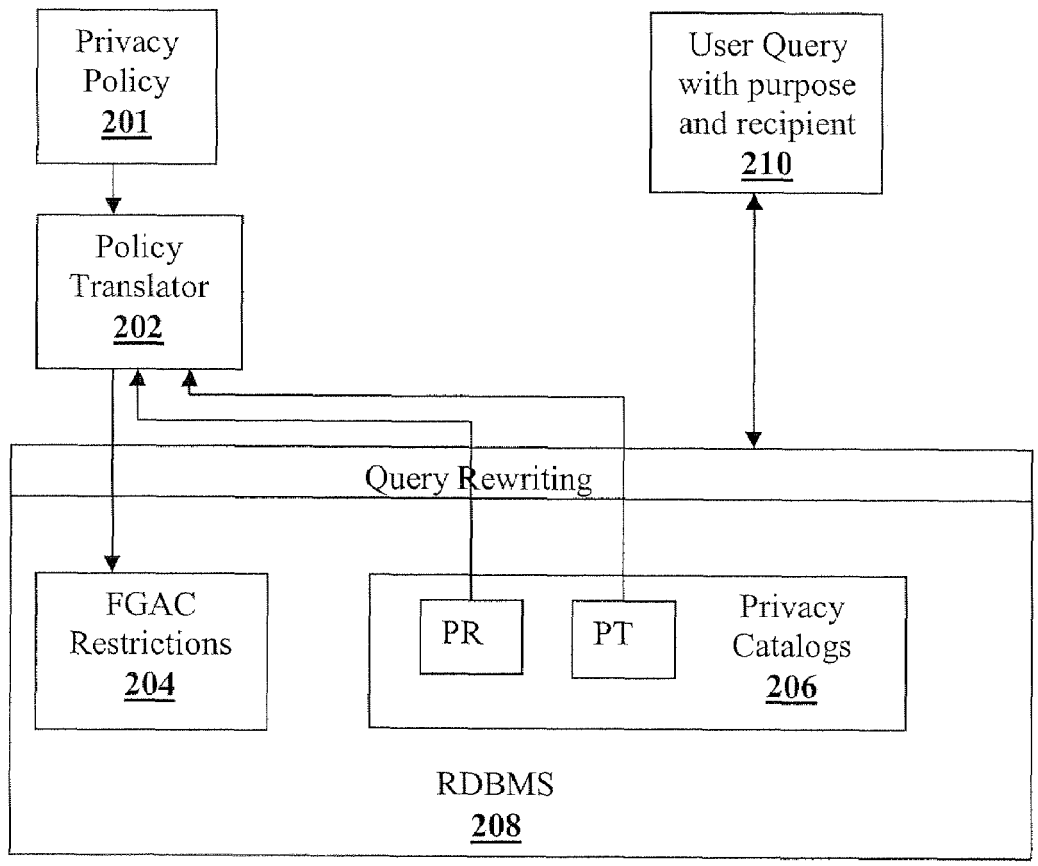
FIG. 1 illustrates fine grained restriction syntax, as per the present invention.
FIG. 2 illustrates implementation architecture for constructs, as per the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Databases of the future must ensure the privacy of the data subjects whom they store information on. The security functionality offered by current commercial database products does not adequately address the key issues necessary to enforce privacy compliance: cell level policy enforcement. Compliance with current privacy legislation mandates that the user's consent be obtained for the use/disclosure of their personal information. Row or column level restrictions are not adequate for modeling scenarios where individuals may have opt-in/out choices with different aspects of their information. To achieve this goal of minimal disclosure while allowing useful tasks to be performed on relevant information, cell level enforcement is key. A similar case for cell level enforcement is made in article titled, "Limiting disclosure in Hippocratic Databases" by LeFevre et al.

The U.S. Department of Health and Human Services website provides a scenario requiring adherence to the HIPAA regulation. BlueCo is a healthcare provider that stores personal data on individuals who enroll in its plans. BlueCo has affiliations with a number of hospitals, research institutions, and marketing companies. Under HIPAA, any individually identifiable healthcare information held or transmitted by BlueCo is considered protected private information. For any use or disclosure of protected health information that is not for treatment, payment, or health care operation and that is not otherwise permitted (e.g. law enforcement), Blue Co must get the data subject's consent.

A simplified version of BlueCo's database is given in Table 1. ReasearchCo is an epidemiological research institute that periodically harvests BlueCo's data. Under HIPAA, all clients must give their consent for release of their home and office numbers.

TABLE 1

Table of BlueCo's clients

| ID | Name | Home Phone | Work Phone | Salary |
|---|---|---|---|---|
| 1 | Alicia Campbell | 408-418-5198 | 408-419-9111 | 10,000 |
| 2 | Bob Bobbett | 408-418-5198 | 408-419-9112 | 20,000 |
| 3 | Carl Abrahams | 408-333-6633 | 408-419-9113 | 30,000 |
| 4 | Dan Charmer | 408-432-8644 | 408-419-9114 | 40,000 |
| 5 | Ellen Generous | 408-555-1235 | 408-419-9115 | 50,000 |

Alicia Campbell opts out of having her home phone number, but does not mind if BlueCo discloses her office number. A researcher at Research Co issues the following query:

select name, homephone, officephone
from clients where salary<=30000

Given the choices that Alicia made, only her name and office phone number should be displayed as shown in Table 2.

TABLE 2

Cell Level Enforcement

| Name | Home Phone | Office Phone |
|---|---|---|
| Alicia Campbell | — | 408-419-9111 |
| Bob Bobbett | 408-418-5198 | — |
| Carl Abrahams | 408-333-6633 | 408-419-9113 |

Database systems employing row level controls restrict disclosure of all information in a particular row, when a restriction is only on particular columns in that row.

Thus, using conventional row level controls, the results for the query are those shown in Table 3. Both Alicia and Bob are no longer present in the result, even though they have agreed that one of their two phone numbers can be disclosed. This simple example illustrates the inadequacy of row level restrictions. Similar arguments can be made for column level restrictions. They are not flexible enough to allow disclosure of non-sensitive data and suppression of sensitive data on a subject by subject basis.

TABLE 3

Row Level Enforcement

| Name | Home Phone | Office Phone |
|---|---|---|
| Carl Abrahams | 408-333-6633 | 408-419-9113 |

The present invention presents constructs for imbuing relational database systems with fine grained access control and show how they can be used to enforce disclosure control enunciated in the vision for Hippocratic databases as described in article entitled, "Hippocratic Databases" by Agrawal et al. These constructs have been designed to fit well with the rest of the infrastructure of a relational database system. The present invention also provides for the implementation of proposed FGAC constructs. The present invention further describes how privacy policies written in a higher-level specification language such as P3P can be algorithmically translated into the proposed constructs.

Constructs defined according to the present invention, allow restrictions to be specified on the access to data in a table at the level of a row, a column, or a cell (i.e. individual column-row intersections). Privacy policies specified in high-level languages such as P3P can be translated into these constructs, or the policy could be specified directly using these constructs.

The proposed construct is complimentary to the current table level authorization mechanisms provided by commercial database systems using the 'grant' command as described in pages 122–128 of book entitled, "A complete Guide to DB2 Universal Database" by Don Chamberlin. While the 'grant' command controls whether a user can access a table at all, the constructs of the present invention define the subset of the data within a table that the user is allowed to access. Conceptually, a restriction defines a view of the table in which inaccessible data has been replaced by null values. As discussed in article entitled, "Limiting disclosure in Hippocratic Databases" by LeFevre et al, it is possible to use either "table semantics" or "query semantics". With query semantics, if all the values in a row are hidden by a restriction, then the row is omitted altogether from the view. With table semantics, the row would instead be retained unless a primary key column is restricted.

FIG. 1 gives the syntax of a fine grained restriction command, as per the present invention. It states that those in auth-name-1 except those in auth-name-2 are allowed only restricted access to table-x. As a short hand, the restriction can be defined for public (i.e., all users), and in that case the exception to all users can be provided in auth-name-2. The keywords group and user can be used to qualify the authorized names. FIG. 1's table-x can be any table expression.

A restriction, as per the present invention, presents a single command that comprises a combination of access control and privacy policy restrictions. A restriction can be specified at the level of a column, a row, or a cell. More than one restriction can be specified on a table for the same user. A restriction may also specify purposes and/or recipients for which the access is allowed. If no purpose or recipient is specified, then the restriction applies to all purposes and recipients respectively. If a purpose or recipient is specified, the user's access is limited to only the specified purpose-recipient combinations.

Akin to the database system variable user that can be referenced in queries and returns the id of the user issuing the query, the new system variables purpose and recipient return the list of purposes and recipients from the current query context. These values in turn determine the restrictions for the current query.

The command-restriction that appears as the last element of the syntax has the following form and states that access can be restricted to any combination of select, delete, insert, or update commands:

restricting access to (all|(select/delete/insert|update)+)

The Customer table with the following schema: Customer (id integer, name char(32), phone char(32)) is used below for illustration purposes.

Column Restriction:

A column restriction specifies a subset of the columns in table-x that auth-name-1 is allowed to access. The following restriction, named r1, ensures that only the id column of Customer is accessed by any database user:

create restriction r1
on Customer
for public
to columns id
restricting access to all The restriction r2 below ensures that members of the account group and user Bob have only select access to columns name and phone.

create restriction r2
on Customer
for group acct, user Bob
to columns name, phone
restricting access to select Row Restriction:

A row restriction gives the subset of rows in table-x that auth-name-1 is allowed to access. This subset is specified using a search-condition over table-x. The restriction r3 below ensures that every access to Customer is qualified by the predicate, name=user.

create restriction r3
on Customer
for public
to rows where name=user
restricting access to all If user Bob issues select * from Customer, he would see id, name and phone for those rows where name equaled Bob.

Cell Restriction:

A cell restriction defines the row-column intersections that auth-name-1 is allowed to access. It is possible to specify multiple column-name lists, each possibly annotated with a search-condition. A search-condition is a correlated subquery with an implicit correlation variable t defined over the tuples of table-x. Access to the columns in column-name-list for each individual row identified by t is conditionally granted depending upon the result of the search condition. If no search-condition is given, then access is granted to all column values in column-name-list in table-x. If the search condition ignores the implicit correlation variable, then access is granted or denied to all columns values in column-name-list in table-x, depending upon the result of the search-condition.

The following is an example of a cell restriction used to enforce individual user's privacy preferences expressed as opt-in/out choices. Assume that for the purpose of marketing, Bob is allowed to see name, but his access to phone is allowed only if the user has opted-in to revealing her phone number.

```
create restriction r4
on Customer for user Bob,
to cells    name,
            (phone where exists (
            select 1
            from SysCat.Choices_Customer c
            where c.ID = Customer.ID and c.CI = 1))
    for purpose marketing
    for recipient others
restricting access to select
```

The above restriction specifies cell restrictions for two column-name-lists: The first list contains the name column, and the second contains the phone column. The restriction allows Bob access to name, only if the variable purpose includes marketing, and recipient includes others. Otherwise, all values of the name column will be null for Bob.

The second list of columns has a search-condition associated with it since access to phone is dependent upon individual user choices. The search-condition comprises an existential subquery that uses the implicit correlation variable Customer. For each row in Customer, the subquery verifies, using the SysCat.Choices Customer table that stores individual opt-in/out choices, whether the user has opted-in for the disclosure of her phone number (represented by a column value of 1).

Combining Multiple Restrictions:

If multiple restrictions have been defined for a user u and a table T, then u's access to T is governed by the combination of these restrictions.

Assume initially that a user associates with a query a single purpose and a single recipient. Two design choices for combining multiple restrictions have been considered Intersection—User u is allowed access to data defined by the intersection of all applicable restrictions. The details are shown in Table 4.

Union—User u is allowed access to data defined by the union of all applicable restrictions. The details are shown in Table 5.

TABLE 4

Combining Restrictions with Intersection

| | row | column | cell |
|---|---|---|---|
| row | The search conditions of individual restrictions are and'ed together to define the intersection of rows accessible to a user. | The row restriction limits the rows accessible to the user. The column restriction further limits the columns within the rows accessible to the user. | The row restriction limits the rows accessible to the user. Within each row, the cell restriction further limits the access to the cells that qualify the cells' search condition. |
| column | | The user's access is limited to those columns that appear in both of the column restrictions. | Column and cell restrictions intersect to limit access to only those columns that appear in both the restrictions. In addition, the cells restriction's search-condition further limits accessible cells within a column. |
| cell | | | The search-conditions are and'ed together and the user is allowed access to a cell if the composite condition is satisfied for the cell. The value of the composite condition for a cell that does not appear in both the restrictions is false. |

TABLE 5

Combining Restrictions with Union

|  | row | column | cell |
|---|---|---|---|
| row | The search conditions of individual restrictions are or'ed together to define the union of rows accessible to a user. | The user is given access to all the cells for any row that satisfies the row restriction. Additionally, the user is allowed access to all the cells in any of the columns that satisfies the column restriction, irrespective of whether the corresponding rows satisfy the row restriction. | The user is given access to all the cells in any of the rows that satisfy the row restriction. Additionally, the user is allowed access to all other cells that satisfy the cell restriction's search-condition, irrespective of whether the corresponding rows satisfy the row restriction. |
| column |  | The user is allowed access to a column if it appears in either of the two column restrictions. | The user is given access to all the cells in any column appearing in the column restriction, regardless of whether the cell restriction is satisfied for these cells. For cells in a column for which the column restriction does not apply, access is given if the cell restriction is satisfied. |
| cell |  |  | The search conditions are or'ed together and the user is allowed access to a cell if the composite condition is satisfied for the cell. |

If the commands specified in the command-restriction clauses of the restrictions being combined are different, they are respectively and'ed or or'ed depending upon the choice of intersection or union semantics.

Multiple restrictions can be combined in any order, both with intersection and union semantics. With the intersection semantics, the user's access to data decreases as additional restrictions are applied. Conversely, with union semantics, access to data increases as additional restrictions are applied.

Finally, if a query is annotated with multiple purpose recipient pairs, instead of a single pair, then restrictions governing access to any of the pairs become relevant for the query. These restrictions are then combined as above. Note that once a user's access to a table has been restricted, the user can only access the data allowed for the purposes and recipients specified in the restrictions.

A system for implementing the constructs of the present invention is shown in FIG. 2. Cell level restrictions limited to select statement access are discussed in the remainder of the application; however, FGAC restrictions also apply to row and column level restrictions.

A policy translator 202 accepts a privacy policy 201 (written in, for example P3P) and metadata stored in privacy catalogs 206 in database 208 and generates restrictions that implement the policy. FGAC restrictions 204 are a combination of the privacy policy restrictions generated by policy translator 202 and access control restrictions that may be defined in the database. The FGAC restrictions relevant to individual queries annotated with purpose and recipient information 210 are identified and combined, and the user's query is transformed into an equivalent query over a dynamic view that implements the restriction. The schema of the privacy metadata catalogs shown in FIG. 2 used to drive the translation of P3P privacy policies into cell level restrictions are given below:

PR (purp-recip char(18),
p3ptype char(32),
choice tabname char(32),
choice colname char(32))
PT (p3ptype char (32), tabname char(32), colname char (32))

Table PR stores, for each purpose, recipient and p3p data type pair, the (table name-column name) pair that records individual user opt-in/out choice, should any choice be available for that combination. Table PT stores, for each P3P data type, the table names and column names which store values of these P3P types.

Figure 3:
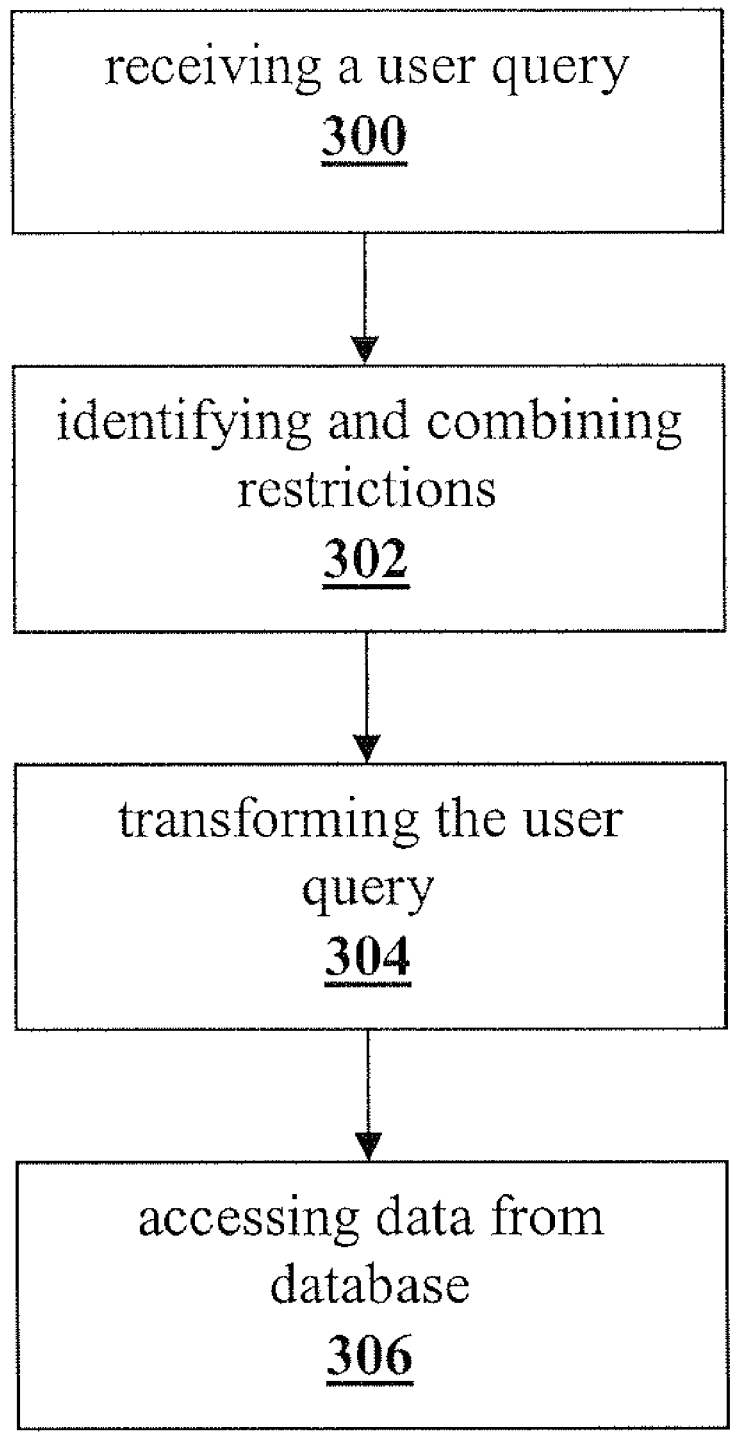
FIG. 3 illustrates a method of providing fine grained access control within a database, as per the present invention.

FIG. 3 is a flowchart illustrating an exemplary method as per the teaching of the present invention to provide fine grained access control within a relational database. A user query is received at step 300. The user query is annotated with purpose and recipient information. FGAC restrictions which are a combination of privacy policy and access control restrictions are stored in the database. These FGAC restrictions may be specified at the level of individual rows, columns, cells, or a combination of these. In step 302, the FGAC restrictions relevant to the user query are identified and combined. The user query is then transformed into an equivalent query over a dynamic view that implements the restriction, in step 304. The data from the database is accessed based on the equivalent query, in step 306.

FIG. 4 illustrates an exemplary algorithm, as per the teaching of the present invention, which enforces the fine grain restrictions. For ease of exposition, it is assumed that there is a single purpose-recipient pair associated with a query and there is at most a single restriction which is relevant for the query. The enforcement algorithm combines the restrictions relevant to individual queries annotated with purpose and recipient information and transforms the user's query into an equivalent query over a dynamic view that implements the restriction.

In detail, Line 1 iterates over each table reference tin a query Q. Line 2 accesses metadata to determine if there is a restriction r governing the usage of t by user u who is submitting the query Q. If no such restriction exists, then t remains unmodified in Q. Otherwise, Lines 3 and 4 replace each reference to table tin query Q with a reference to a dynamic view v.

The generation of the dynamic view v is implemented in Lines 5 through 25. The view v is a select statement which conditionally projects each column c∈t. Line 7 searches for a column reference to c∈r. If no such reference exists with the purpose/recipient of query Q, then the user u is not allowed access to c and Line 8 thus projects a null value for all values of c. Otherwise, Line 10 searches for a where clause associated with c∈r. If no such clause exists, then u is granted unconditional access to c. Otherwise, Line 15 outputs the condition of the where clause into a SQL case statement which verifies the condition before outputting the value of c (on Line 18). If the condition is false, access to the column value is denied and Line 19 outputs a null value for c.

The following illustrates the basic syntax of the P3P policy specification language:

```
<POLICIES> . . .
    <POLICY name = "Policy_Name1"> . . .
        <STATEMENT>
        . . .
            <PURPOSE>
                stated-purpose
                    [ required = ("always"|"opt-in"|"opt-out") ]
            </PURPOSE>
            <RECIPIENT>
                stated-recip
                    [ required = ("always"|"opt-in"|"opt-out") ]
            </RECIPIENT>
            <RETENTION> retention_val </RETENTION>
            <DATA GROUP>
                <DATA ref = data-ref-val>
                . . .
            </DATA GROUP>
        </STATEMENT>
    </POLICY>
    <POLICY>
    . . .
    </POLICY>
    . . .
</POLICIES>
```

The process of transforming a policy like the one above into fine grained restrictions involves: (1) parsing the policy to extract the list of statements, (2) mapping data abstractions into their implementation specific equivalents, e.g. in the above specification this would mean mapping data-ref-val to its corresponding table name(s) and column name(s), (3) structuring the choice tables which record individual user opt-in/out choices (in some cases, this may not be necessary since there may be no such choices), and (4) generating the restriction statements. Assuming that data-ref-val maps to columns A and B of table T, the above abstract specification would lead to the following restriction being constructed:

create restriction Policy Name 1
on T
for public
to cells A,B
[where opt-in-out-conditions]
for purpose stated-purpose
for recipient stated-recip
restricting access to select FIG. 5 is a detailed example of a privacy policy, for a fictional Healthcare provider. The metadata contains the information needed to associate "#personal" (personal information) and "#medical" (medical information) with database tables which store this information. Personal information maps to the name, SSN, address, email and DOB fields of the Patients table, while medical information maps to the xray, pharmacy, family, appointment and lifestyle fields of the Patients table. Physician, Healthcare and Drug_Research are assumed to be user roles and thus do not require refining. Thus, the P3P healthcare policy given in FIG. 5 is translated into the restrictions given in FIG. 6. For simplicity, the restrictions in FIG. 6 assume that all columns in a P3P policy are contained in a single table.

The creation and population of the Choices_Patients table should be coordinated to synchronize with the creation and update of the patients table. The policy translator modifies the structure of the choices_patients table to ensure that the correct number of choice fields are present for recording opt-in/opt-out decisions for a particular table. In the above example, C1 represents the choice to allow Drug_Research to see personal data if the drug research is being conducted by the healthcare company itself. Choice C2 is the option to allow usage of personal data for drug research by other healthcare companies having the same privacy policy as this company. The example illustrates the basic steps involved in the translation process. FIG. 7 gives the pseudo-code showing the steps involved in transforming P3 policy into the present invention's language constructs.

A unique restriction name, needed for the command is generated on Line 2. Line 3 uses the mapP3PPolicyToTable function to uncover the table name which stores the information described by the data types in the P3P statement. This metadata is populated by the database administrator. On Line 4, the set of users who are authorized to access data specified by the policy are obtained using the mapP3PPolicyToAuthorizedUsers command which uses database metadata to derive the set of authorized users. The database administrator is responsible for populating this information in the database metadata tables. Line 10 uses the mapP3PDataTypeToColumns function to retrieve the column names that store information described by the P3P data types in the statement. Again, this information has been prepared and supplied by the database administrator and stored in metadata tables.

The function mapP3PPurposeToChoiceTable accepts a statement id and returns the table storing individual user choices for this statement. The function mapP3PPurposeToChoiceColumn accepts a statement-purpose pair and returns the column in the choice table which records the corresponding users' choices. Both these functions are driven from metadata.

Although the present invention, as described, provides restrictions specified for tables and at least one or a combination of rows, columns or cells in a relational database; it should be noted that restrictions can also be specified for collection of objects and attributes of these objects in an object database, or collection of documents and attributes of elements in these documents in an XML database. Hence, how such restrictions are specified should not be used to limit the scope of this invention.

Additionally, the present invention provides for an article of manufacture comprising computer readable program code contained within implementing one or more modules to provide fine grained access control in a relational database. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for:

(a) aiding in receiving a user query;

(b) identifying and combining restrictions relevant to the user query, the restrictions specifying access to data in a table in the database at the level of at least one or a combination of: individual rows, individual columns or individual cells, and the restrictions comprising a combination of access control and privacy policy restrictions;

(c) transforming the user query into an equivalent query which implements the restrictions; and (d) aiding in accessing the data based on the equivalent query.

CONCLUSION

A system and method has been shown in the above embodiments for the effective implementation of extending relational database systems to automatically enforce privacy policies. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware. Moreover, the present invention should not be limited to how the restrictions are specified. All programming and data related thereto are stored in computer memory, static or dynamic, and may be retrieved by the user in any of: conventional computer storage, display (i.e., CRT) and/or hardcopy (i.e., printed) formats.

What is claimed is:

1. A method of providing fine grained access control within a database, said method comprising:

receiving a user query;

identifying and combining restrictions relevant to said user query, said restrictions specifying access to data in a table in said database at the level of at least one of or a combination of: individual rows, individual columns or individual cells, and said restrictions comprising a combination of access control and privacy policy restrictions, said privacy policy restrictions being generated by transforming a privacy policy by the following steps:

parsing said privacy policy to extract a list of statements, mapping data abstractions in said privacy policy into their implementation specific equivalents, structuring choice tables which record individual user opt-in/out choices, and generating restriction statements;

transforming said user query into an equivalent query which implements said restrictions; and accessing said data based on said equivalent query.

2. A method of providing fine grained access control within a database, according to claim 1, wherein said restrictions are generated by transforming said privacy policy and using privacy metadata catalogs.

3. A method of providing fine grained access control in a database, according to claim 1, wherein said restrictions are combined by union or intersection.

4. A method of providing fine grained access control in a database, according to claim 2, wherein said privacy policy is written in high-level policy language.

5. A method of providing fine grained access control in a database, according to claim 4, wherein said high-level policy language is P3P.

6. A method of providing fine grained access control in a database, according to claim 2, wherein said privacy metadata catalogs store individual opt-in/opt-out choices.

7. A method of providing fine grained access control in a database, according to claim 1, wherein said restrictions specify purposes and/or recipients for which access is allowed.

8. A system providing fine grained access control (FGAC) within a database, said system comprising:

a database to store privacy metadata catalogs and FGAC restrictions, said FGAC restrictions specifying access to data in a table in said database at the level of at least one of or a combination of: individual rows, individual columns or individual cells and said FGAC restrictions comprising a combination of access control and privacy policy restrictions, said data of said database being accessed based on a transformed equivalent query which implements said FGAC restrictions; and a policy translator to accept as input a least a privacy policy and said privacy metadata catalogs, said policy translator transforming said privacy policy into said privacy policy restrictions by: parsing said privacy policy to extract a list of statements, mapping data abstractions in said privacy policy into their implementation specific equivalents, structuring choice tables which record individual user opt-in/out choices, and generating restriction statements.

9. A system providing fine grained access control (FGAC) within a database, according to claim 8, wherein said privacy policy is written in high-level policy language.

10. A system providing fine grained access control (FGAC) within a database, according to claim 9, wherein said high-level policy language is P3P.

11. A system providing fine grained access control (FGAC) within a database, according to claim 8, wherein said privacy metadata catalogs store individual opt-in/opt-out choices.

12. A system providing fine grained access control (FGAC) within a database, according to claim 8, wherein said FGAC restrictions specify purposes and/or recipients for which access is allowed.

13. An article of manufacture comprising a computer usable medium having computer readable program code embodied therein which provides fine grained access control within a database, said medium comprising:

computer readable program code aiding in receiving a user query;

computer readable program code identifying restrictions on access to data in a table in said database at the level of at least one or a combination of: individual rows, individual columns or individual cells, said restrictions comprising a combination of access control and privacy policy restrictions;

computer readable program code transforming a privacy policy into said privacy policy restrictions by: parsing said privacy policy to extract a list of statements, mapping data abstractions in said privacy policy into their implementation specific equivalents, structuring choice tables which record individual user opt-in/out choices, and generating restriction statements;

computer readable program code transforming said user query into an equivalent query which implements said restrictions; and computer readable program code aiding in accessing said data based on said equivalent query.

* * * * *